T. BARROW.
HOLLOW SHEET METAL STRUCTURE AND THE MANUFACTURE THEREOF.
APPLICATION FILED FEB. 20, 1918.

1,312,152. Patented Aug. 5, 1919.

UNITED STATES PATENT OFFICE.

THOMAS BARROW, OF WHEATLAND, PENNSYLVANIA, ASSIGNOR TO BLAW-KNOX COMPANY, OF HOBOKEN, PENNSYLVANIA, A CORPORATION OF NEW JERSEY.

HOLLOW SHEET-METAL STRUCTURE AND THE MANUFACTURE THEREOF.

1,312,152.     Specification of Letters Patent.     Patented Aug. 5, 1919.

Application filed February 20, 1918. Serial No. 218,348.

*To all whom it may concern:*

Be it known that I, THOMAS BARROW, a citizen of the United States, residing at Wheatland, in the county of Mercer and State of Pennsylvania, have invented a new and useful Improvement in Hollow Sheet-Metal Structures and the Manufacture Thereof, of which the following is a full, clear, and exact description, reference being had to the accompanying drawings, forming part of this specification, in which—

Figure 1:
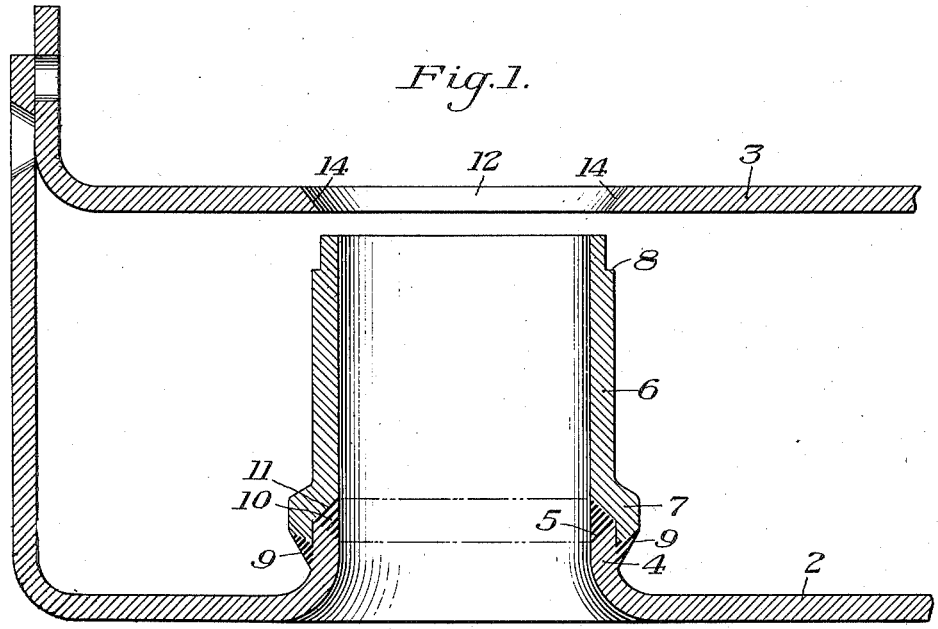
Figure 2:
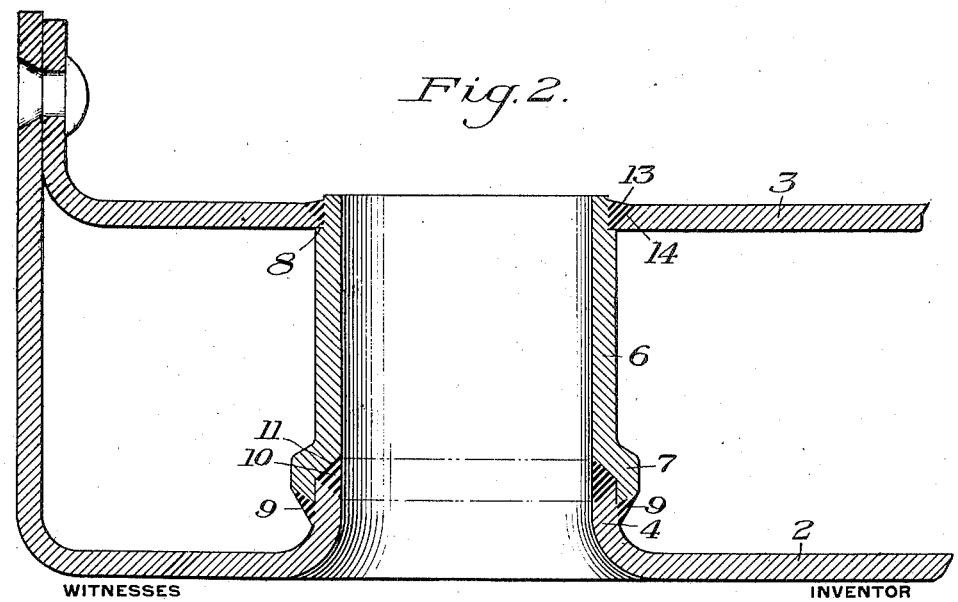

Figure 1 is a sectional view showing in partly assembled condition a structure embodying my invention; and Fig. 2 is a similar view showing the completed structure.

My invention has relation to sheet metal structures of that class which are provided with twyer or other laterally inclosed openings which extend therethrough. My invention is designed to provide a structure of this character having a twyer or other hollow member extending therethrough which is practically integral with the portion of the structure through which it extends. Also to provide a method of making the same which can be readily carried out at a relatively small expense and in a simple and convenient manner.

The nature of my invention will be best understood by reference to the accompanying drawing, in which I have shown the preferred embodiment thereof and which will now be described, it being premised, however, that the particular structure shown is illustrative only of my invention, and that the details of the invention may be varied within the scope of the appended claims in applying it to other structures of different specific character.

In these drawings, the numeral 2 designates one of the sheet or plate members composing the body of the structure, and 3 the opposing sheet or plate member forming the opposite wall of the structure. These two plates or sheets may be united in any usual or suitable manner, as by the flanging and riveting indicated.

In carrying out my invention, I form an aperture in the member 2, and then flange inwardly the surrounding walls of this aperture, as indicated at 4. The free edge of this inturned flange is preferably beveled, as shown at 5. I also provide a sleeve or twyer member 6, one end of which is provided with an enlarged portion 7, of the proper diameter to fit over the inturned flange 4. The opposite end portion of the member 6 is preferably shouldered, as shown at 8. The member 6 is then welded to the inturned flange 4 by a surrounding external weld 9, and an internal weld 10. Preferably the enlarged portion 7 of said member is provided with an internal bevel at 11 so as to provide with the beveled edge 5 V-shaped recess into which metal may be flowed in making the internal weld.

I then bring the upper member in place, this member having an aperture 12, which is adapted to receive the free end portion of the memebr 6, beyond the shoulder 8, and firmly unite the member 3 to the member 6 by a weld, such as indicated at 13. Preferably the wall of he aperture 10 is beveled outwardly, as indicated at 14, so as to form a seat for the metal used in making the weld.

The several operations described may be readily and conveniently carried out at a comparatively small expense, and the finished structure is in this manner provided with a twyer or other laterally inclosed opening extending therethrough, the walls of which are practically integral with the walls of the structure to which it extends and in which liability to leakage is obviated, owing to the absence of all sections or joints. By reason of the shoulder 8, the twyer also forms a proper spacer for the twyers or sheets 2 and 3.

I claim:

1. A structure of the character described, having one of its walls provided with an inturned flange in which the thickness of the metal has not been materially reduced, and a hollow member provided with an enlarged portion telescopically engaging said flange and welded thereto and having its opposite end portion seated in and secured to the opposite wall of the structure, substantially as described.

2. A structure of the character described, having one of its walls provided with an inturned flange in which the thickness of the metal has not been materially reduced, and a hollow member provided with an enlarged portion telescopically engaging said flange and welded thereto and having its opposite end portion seated in and welded to the opposite wall of the structure, substantially as described.

3. A structure of the character described, having one of its walls provided with an opening having an inturned flange portion in which the thickness of the metal has not been materially reduced, and a hollow member having an enlarged end portion telescopically engaging said flange portion and united thereto by internal and external welds, said sleeve member having its opposite end portion shouldered and seated and secured in an opening in the opposite wall of the structure, substantially as described.

4. A structure of the character described, having one of its walls provided with an opening having an inturned flange portion in which the thickness of the metal has not been materially reduced, and a hollow member having an enlarged end portion telescopically engaging said flange portion and united thereto by internal and external welds, said sleeve member having its opposite end portion shouldered, and seated and secured by welding in an opening in the opposite wall of the structure, substantially as described.

5. The method of making hollow structures, having a twyer or other laterally inclosed opening extending therethrough, which consists in forming in one of the wall members of the structure an opening having a surrounding projecting flange without materially reducing the thickness of the flange, providing a hollow tubular member enlarged at one end portion, telescopically engaging said enlarged portion with the said flange and uniting it thereto by interior and external welds, and then engaging the other end portion of the tubular member with an opening in the opposite wall member of said structure and welding it therein, substantially as described.

In testimony whereof, I have hereunto set my hand.

THOMAS BARROW.